United States Patent
Ghasabyan et al.

(10) Patent No.: US 11,519,836 B1
(45) Date of Patent: Dec. 6, 2022

(54) FPGA-BASED MATERIALS TESTING

(71) Applicant: TACTUN LLC, Yerevan (AM)

(72) Inventors: Rafayel Ghasabyan, Yerevan (AM); Arev Hambardzumyan, Yerevan (AM)

(73) Assignee: TACTUN LLC, Yerevan (AM)

( * ) Notice: Subject to any disclaimer, the term of this patent is extended or adjusted under 35 U.S.C. 154(b) by 0 days.

(21) Appl. No.: 17/719,391

(22) Filed: Apr. 13, 2022

(51) Int. Cl.
*G01N 3/06* (2006.01)

(52) U.S. Cl.
CPC .......... *G01N 3/06* (2013.01); *G01N 2203/003* (2013.01)

(58) Field of Classification Search
CPC .............. G01N 3/06; G01N 2203/003; G01N 29/2475; G06F 30/331; G06F 1/305; G06F 9/441; G01R 31/318357; G01R 31/3183; G01R 31/318516; G05B 19/042; G05B 9/02; G06N 20/00; H01L 21/28088
See application file for complete search history.

(56) References Cited

U.S. PATENT DOCUMENTS

| | | | |
|---|---|---|---|
| 7,240,564 B2 * | 7/2007 | Totman | G01N 3/066 73/827 |
| 2007/0164785 A1 * | 7/2007 | He | G06F 30/34 326/41 |
| 2008/0177507 A1 * | 7/2008 | Mian | G06F 15/7867 702/189 |

* cited by examiner

*Primary Examiner* — Brandi N Hopkins
(74) *Attorney, Agent, or Firm* — Arluys IP, P C.

(57) ABSTRACT

Techniques are described for a materials test controller that includes a Field-Programmable Gate Array (FPGA). The FPGA is configured for acquiring sensor data from sensor device(s) that measure the current state of sample material(s) on which the materials testing is performed. For controlling the actuator device, the FPGA generates a waveform of setpoints; each setpoint represents a desired state of the materials testing. Based on the sensor data, the FPGA calculates process variable(s) for input to a control logic of the FPGA. Using multiple iterations to generate output signals for the actuator device, the control logic receives the process variable(s) and a setpoint of, and based at least on these received inputs, generates an output signal. The output signal of the FPGA causes the actuator device to transition from the current state to a new state that is closer to the desired state as measured by the sensor devices.

20 Claims, 10 Drawing Sheets

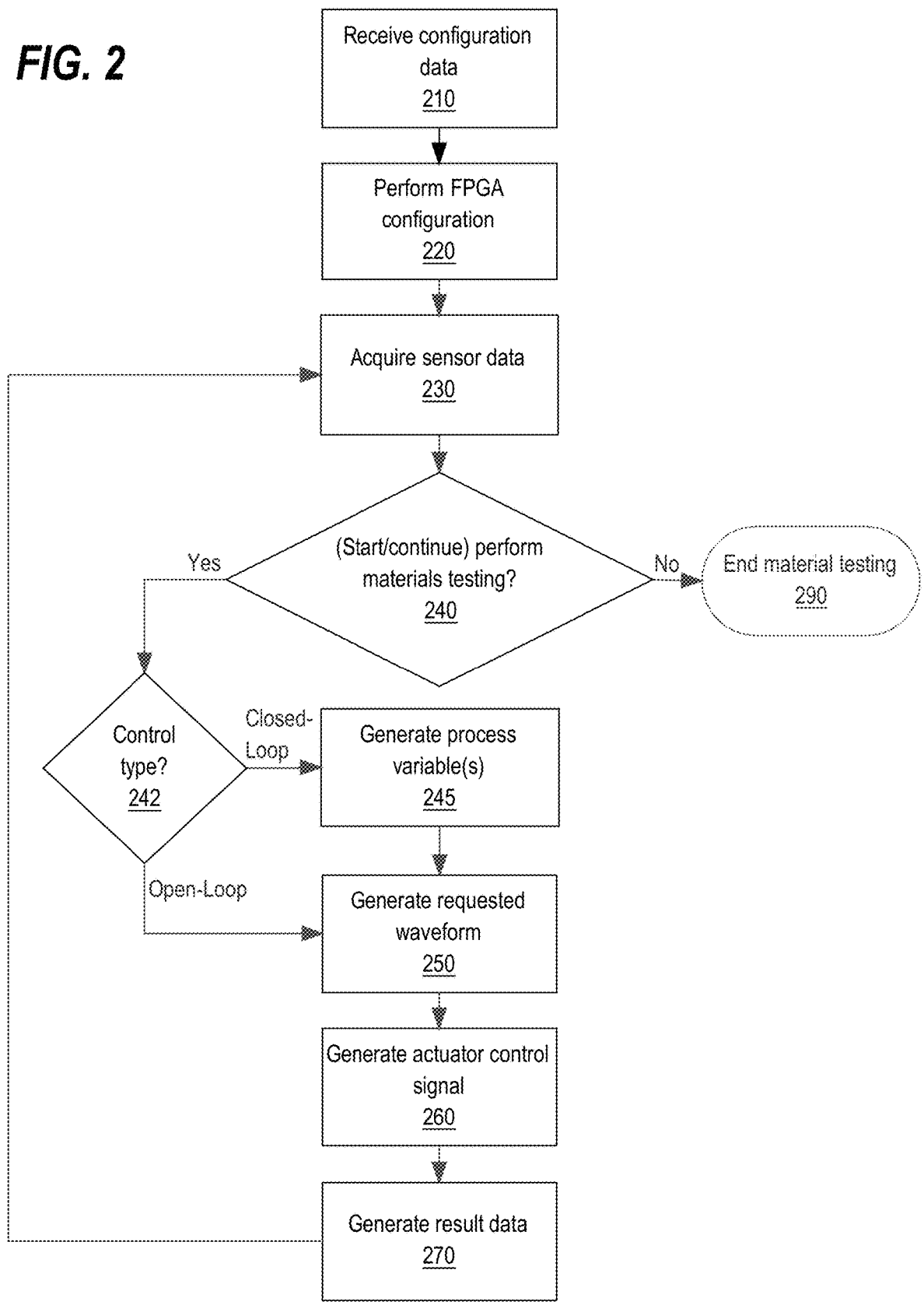

FPGA-BASED MATERIALS TESTING

FIELD OF THE TECHNOLOGY

The present invention relates to the field of materials testing, in particular to FPGA (Field Programmable Gate Array) based materials testing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern materials testing requires scalability, adaptability, parallelism, and speed. With the advance in materials sciences, the variety of materials rapidly increases every day. Such an increase in the variety of materials drives a similar increase in the number of standards for testing these new materials. Because the new materials are more advanced, such materials may have multiple different properties for testing, multi-vector test scenarios, more precise and complex calculations, and/or higher rate of changes in test scenarios.

More importantly, some materials require very fast feedback during testing. The testing standard for materials may require adjustments to the testing of the materials based on the current condition (e.g., active feedback loop). Such materials test requires speed and/or parallelism in data processing, calculations, and output signal generation.

Additionally, the hardware of the materials test equipment is costly; thus, it is not cost-effective to change/replace the hardware of the materials test equipment for each new standard and/or material. Accordingly, flexible architecture is required to adapt to the same materials test equipment for the variety of materials and/or standards.

BRIEF DESCRIPTION OF THE DRAWINGS

In the drawings of certain embodiments in which like reference numerals refer to corresponding parts throughout the figures:

FIG. 2 is a flowchart that depicts a process for performing materials testing with FPGA-based MTS 100, in an embodiment.

DETAILED DESCRIPTION

Figure 1A:
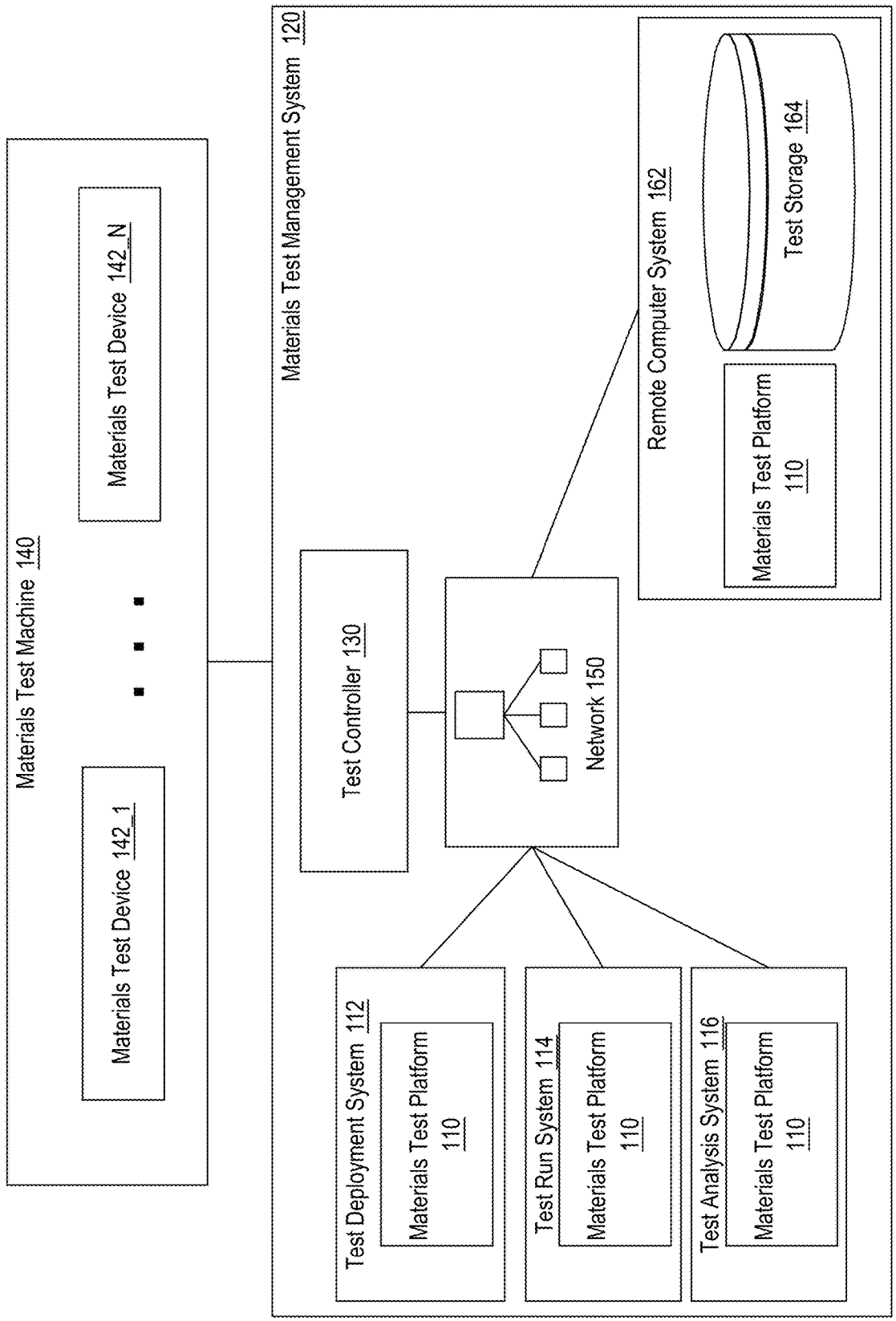
FIG. 1A is a block diagram that depicts Materials Test System (MTS) 100, in one or more embodiments.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

GENERAL OVERVIEW

Materials test equipment is controlled by generic (micro-) controller-based systems, but as described above, such controllers may lack adaptability, parallelism, and speed. In contrast, techniques described herein include (Field Programmable Gate Array) FPGA-based controllers that do not have the limitations of such controllers and improve the performance of the test equipment while providing more functions for industrial and research applications. FPGAs have the adaptability and flexibility to combine the strengths of processor and DSP (Digital Signal Processing) and may be used to target a wide range of testing applications.

The main advantages of the FPGAs in materials testing applications are:
  Reconfiguration: using techniques described herein, FPGA may be reconfigured at any time, providing cost-efficient adaptability by updating for materials to support various research and industrial applications in the future.
  Parallelism: using techniques described herein, parallel control and data acquisition circuits may be incorporated into an FPGA for running parallel functions simultaneously. This is especially important for multi-channel test equipment, where several control channels should work in parallel, independently, and simultaneously.
  High speed: using techniques described herein, circuits may be implemented on FPGA hardware to run at a fast clock rate. Combined with the parallel execution of functions within the FPGA, the speed and data throughput requirement for multichannel control and data acquisition may be easily met.

In an embodiment, main materials test control and data acquisition functions are performed by an FPGA-based controller. The use of the FPGA-based controller(s) as a materials test controller provides the highest possible accuracy, control speed, and reliability.

FPGA-based controller(s) functions include one or more:
  Data acquisitions (implementation of drivers for the analog-to-digital converters (ADC) for high-speed data digitization);
  Control/output signal (waveform) generation;
  Feedback control loop implementation;
  Actuator control signal generation (implementation of driver for the digital-to-analog (DAC) converters for high-speed control of actuators, implementation of pulse-width modulation (PWM) signals for actuator control);
  Digital signal monitoring; and/or
  Auxiliary input/output control.

Other functions of controllers for materials testing equipment may be implemented by a CPU, including communication with the FPGA and network-coupled computing devices PC/Tablet/Cloud, data logging, high-level control of the testing process, etc.

SYSTEM OVERVIEW

FIG. 1A is a block diagram that depicts Materials Test System (MTS) 100, in one or more embodiments. Materials Test System 100 includes Materials Test Management System 120 and Materials Test Machine 140. Materials Test Machine 140 is a hardware machine that performs one or more destructive and/or non-destructive materials test(s) on sample material, in an embodiment. Materials Test Machine 140 includes one or more Materials Test Devices 142_1-142_N, where the letter "N" indicates the number of the materials test device(s) in Materials Test Machine 140. Each of Materials Test Devices 142_1-142_N performs one or more functions in the execution of a test and collecting information resulting from the execution of the test. Non-limiting examples of Materials Test Devices 142_1-142_N are an actuator for applying force on a sample, sensors for measuring the generated movement and various effects of the force application, and various safety devices.

In an embodiment, Materials Test Management System 120 manages Materials Test Machine 140, including deployment, provisioning, and configuring Materials Test Machine 140 and its Materials Test Devices 142_1-142_N. Materials Test Management System 120 may configure the test(s) to be performed on sample material(s) and collect/analyze the results of the tests. Materials Test Management System 120 interfaces with Materials Test Machine 140 through Test Controller 130. Test Controller 130 manages the execution of test(s) by Materials Test Machine 140.

Figure 1B:
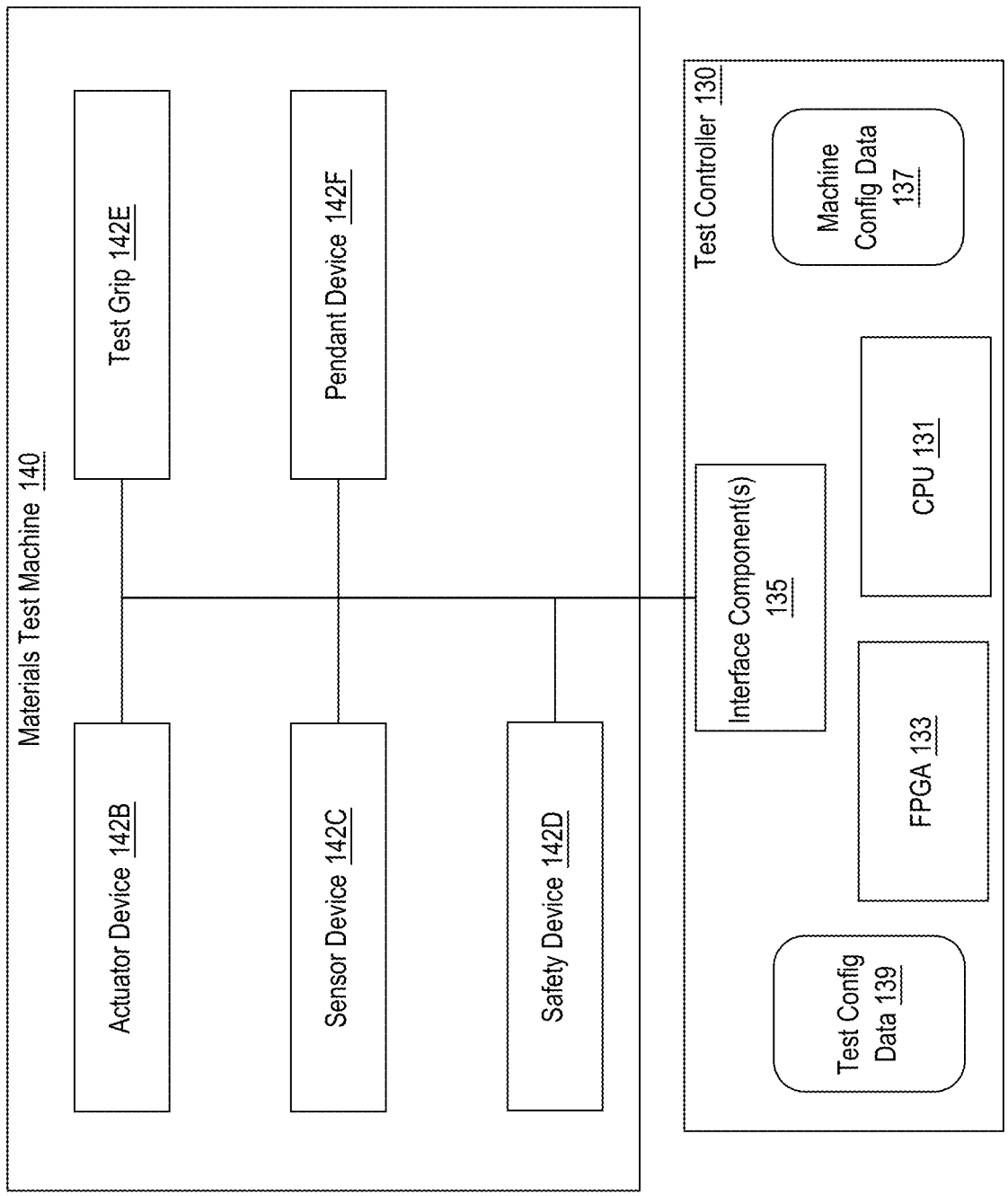
FIG. 1B is a block diagram that depicts Test Controller 130 interfacing with Materials Test Machine 140, in an embodiment.

FIG. 1B is a block diagram that depicts Test Controller 130 interfacing with Materials Test Machine 140, in an embodiment. Test Controller 130 may execute test-related functions on a dedicated digital logic, each of which is configured using instructions, gates, or logic to perform the functions during use or execution. FPGA 133 is such a digital logic depicted as an example in FIG. 1B. In such an example, CPU 131 may receive machine configuration data 137 and test configuration data 139 and may use such data to program FPGA 133 and configure Test Controller 130 and Materials Test Machine 140 for communication. Machine config data 137 includes configurations for Test Controller 130 and/or Materials Test Machine 140 such that, after the configuration, Test Controller 130 may control Materials Test Machine 140 by issuing to and collecting signals from one or more of Test Devices 142B-F. Additionally, or alternatively, CPU 131 may use machine config data 137 and test configuration data 139 to configure Materials Test Devices 142B-F.

Additionally, Test Controller 130 includes test config data 139 for configuring test(s) of sample material(s), in an embodiment. Test Controller 130 (e.g., FPGA 133) is configured according to test config data 139 and issues instructions in the form of the output signal(s) that will cause the execution of the test. The result data of the test may be collected by Test Controller 130 in the form of sensor data, as an example. The sensor data may be used by FPGA 133 to modify the output signals that control the test. The sensor data may also be used by Materials Test Management System 120 for generating test reports.

Test controller 130 communicates with Materials Test Machine 140 to perform configuration(s), initiate and control materials test(s), and collect sensor data, in one or more embodiments. Test Controller 130 may communicate with Materials Test Devices 142_1-142_N (as depicted in FIG. 1A) or Materials Test Devices 142B-F (as depicted in FIG. 1B) of Materials Test Machine 140 using dedicated or shared communication channels. A communication channel with any materials test device may be an input channel, output channel, or a bidirectional input/output channel which can be configured using machine configuration data 137 prior to or during the performance of a materials test).

Communication of FPGA 133 and/or CPU 131 with materials test devices of Materials Test Machine 140 may be performed with or without Interfacing Component(s) 135. Additionally or alternatively, Interfacing Component(s) 135, although depicted as part of Test Controller 130, may be part of Materials Test Machine 140. Non-limiting examples of Interfacing Component(s) 135 include a digital-to-analog converter (DAC) and an analog-to-digital converter (ADC).

Materials Test Machine 140, as depicted in FIG. 1B, contains any number of Actuator Device 142B, Sensor Device 142C, Safety Device 142D, Test Grip 142E, Pendant Device 142F, Camera Device 142G, Gauge Meter 142H, Sample Identifier 142I, and/or Temperature Chamber 142J in one or more embodiments.

Actuator Device 142B may be any type of motor that performs angular or linear motion. Even if Actuator Device 142B produces angular motion, Actuator Device 142B may be coupled to a sample material in a way that its angular motion is transferred into linear motion or vice versa. Non-limiting examples of actuators devices for destructive and non-destructive testing include servo-hydraulic, electro-mechanical, electromagnetic, ultrasound, and laser-based actuators. Actuator Device 142B may receive output signals from Test Controller 130 to produce a movement that affects a sample material according to a materials test.

Sensor Device 142C may be a sensor device that collects the measurements of the effects of a materials test or the measurements of the source(s) that produce the effects. For example, Sensor Device 142C may be a load cell sensor measuring the load force on a sample material. As another example, Sensor Device 142C may be an encoder coupled to Actuator Device 142B that measures the amount of generated movement.

Safety Device 142D causes a materials test to stop if a particular condition related to the safety of the materials test is detected, in an embodiment. Upon the detection, Safety Device 142D may send a signal to Test Controller 130 to abort the materials testing or may use Materials Test Machine 140's electro-mechanical interface to abort the materials testing itself.

Test Grip 142E is an electrical grip that holds the sample material for materials testing, in an embodiment. Test Grip 142E may be communicatively coupled to Test Controller 130, and Test Controller 130 may send command(s) to Test Grip 142E to grip the sample material or to release the sample material. In other embodiments, Test Grip 142E may be manual and/or may be manually controlled.

Pendant Device 142F is an input device for Test Controller 130, which may be programmed for initiating and stopping materials testing on sample material, among other actions, in an embodiment. Pendant Device 142F may be communicatively coupled to Test Controller 130 and may send/receive signals for controlling materials testing, such as the movement of actuator device(s).

Continuing with FIG. 1A, Materials Test System includes Test Deployment System 112, Test Run System 114, Test Analysis System 116, each of which includes Materials Test Platform 110 and may be part of one or more computer systems such as Remote Computer System 162. Remote Computer System 162 may further host Test Storage 164. A non-limiting example of Remote Computer System 162 may be a cloud workload running Test Deployment System 112, Test Run System 114, and/or Test Analysis System 116 and communicatively coupled with a data retrieval service hosting Test Storage 164. Other non-limiting examples of Remote Computer System 162 are an on-premise computing server or an edge computing device communicatively coupled to Test Controller 130 and running similar workloads.

In an embodiment, Materials Test Platform 110 of Test Deployment System 112 provides an interface for configuring Materials Test System 100. Materials Test Platform 120 may query an internal or external database using identifying information about any test device or a materials test machine, or a controller itself, requesting available configuration setting options thereof. Such database may be hosted by Test Storage 164 of Remote Computer System 162.

Materials Test Platform 110 receives setting values for configuring Materials Test Machine 140, Test Controller 130, and/or for communication channels thereof, in an embodiment. By applying such machine configuration data, Test Controller 130 is able to execute and control materials testing on Materials Test Machine 140 and collect the result data. A non-limiting example of machine configuration data includes machine config data 137 of FIG. 1B.

Additionally or alternatively, Materials Test Platform 110 of Test Deployment System 112 may be able to generate machine configuration data without being communicatively coupled to Test Controller 130 and/or Materials Test Machine 140. Materials Test Platform 110 may receive input from a user identifying test machines, test controllers, and/or communication channels between them regardless of whether any of those systems and components are communicatively coupled with Test Deployment System 112. Each generated machine configuration data may be stored in a separate machine configuration data object (e.g., a separate configuration file).

Additionally or alternatively, Materials Test Platform 110 of Test Deployment System 112 provides a user interface for configuring the runtime software of Materials Test Platform 110. Non-limiting examples of software configuration for Materials Test Platform 110 include configuring users, roles and privileges for configuring/running/analyzing test(s), licensing features of Materials Test Platform 110, arrangement and layout for the user interface of Materials Test Platform 110 when executing a test. The generated software configuration may be stored together with other configuration data in the corresponding configuration data object or in a separate software configuration object (e.g., software configuration file).

Materials Test Platform 110 of Test Deployment System 112 provides a user interface for configuring one or more materials tests for executions. A non-limiting example of a configuration of materials test(s) is Test Config Data 139 of FIG. 1B. Such configuration for each materials test may be stored in a separate materials test data object (e.g., materials test file) and/or together with configuration data in the corresponding configuration data object.

In an embodiment, the configuration of tests is performed independent of features of the materials test machine and/or test controller that will perform the execution. In such an embodiment, the mapping of the test configuration to the features of Materials Test Machine 140 (and its Materials Test Devices 142_1-142_N) and Test Controller 130 may occur during the configuration for deployment of Materials Test Machine 140 at Test Deployment System 112, executing Materials Test Platform 110, and/or when the test configuration data is loaded by Test Controller 130 for the execution of the test(s).

Materials Test Management System 120 further includes Test Run System 114 for executing materials tests configured by Test Deployment System 112, in an embodiment. Materials Test Platform 110 of Test Run System 114 may be configured according to software configuration data generated by Test Deployment System 112. Materials Test Platform 110 of Test Run System 114 is communicatively coupled through Network 150 to Test Controller 130.

Based on user input, Materials Test Platform 110 of Test Run System 114 sends instructions to Test Controller 130 over Network 150 to load particular machine and/or test configuration data, in an embodiment. Such machine and test configuration data have been generated by Test Deployment System 112 for Test Controller 130 and Materials Test Machine 140 using the techniques described above.

Alternatively, Materials Test Platform 110 of Test Run System 114 may request Test Controller 130 to load configuration data for Test Controller 130 and Materials Test Machine 140 from Test Storage 164 of Remote Computer System 162.

Once Test Controller 130 and Materials Test Machine 140 are configured, Materials Test Platform 110 may provide a user interface for authentication and authorization of a user to perform a materials test according to the loaded software configuration. Upon success, Materials Test Platform 110 provides a user interface for the user to execute a configured materials test.

Test Analysis System 116 provides a user interface to perform analytics on test results in an embodiment. The test results may be in the form of sensor data from one or more sensors devices of Materials Test Platform 110. Test Controller 130 makes sensor data available to Materials Test Platform 110 of Test Analysis System 116 to perform various analytics and generate test reports. Test Controller 130 or Materials Test Platform 110 may cause the output sensor data for a materials test to be stored in Test Storage 164 of Remote Computer System 162. Analytics performed by Materials Test Platform 110 of Test Analysis System 116 may be offloaded to Remote Computer System 162 for improved performance because Remote Computer System 162 has the additional computing power to process sensor data and generate complex reports.

For the purpose of explanation, FIG. 1A and FIG. 1B depict a limited number of each component; however, various embodiments may include any number of such components.

FUNCTIONAL OVERVIEW

FIG. 2 is a flowchart that depicts a process for performing materials testing with FPGA-based MTS 100, in an embodiment. At step 210, Test Controller 130 receives configuration data for configuring Test Controller 130, including FPGA 133, Materials Test Machine 140, and Materials Test Machine 140's one or more materials test devices. In an embodiment, CPU 131 of Test Controller 130 processes configuration data, including machine config data 137 and/or test config data 139, to determine configuration setting data for FPGA 133. The configuration settings may include parameters for configuring communication channels between Test Controller 130 and Materials Test Machine 140 (e.g., which channel endpoints are connected to which materials testing device), configuring interface component(s) 135 (e.g., ADCs and DACs), configuring control signals (e.g., for generating waveform causing a corresponding movement of Actuator Device 142B), and/or settings of materials testing devices.

The machine configuration data of configuration data may need additional machine configuration data to map Test Controller 130's input/output channels to material devices of Materials Test Machine 140. In such an embodiment, the machine configuration data contains configuration for a general type of material device(s) with which Test Controller 130 may interact. At the deployment, when the machine configuration data is loaded, Test Controller 130 may perform a discovery of materials test devices communicatively coupled to Test Controller 130 via input/output channels. If any configuration setting for any materials test device is missing or a new materials test device is discovered, Test Controller 130 may notify Test Deployment System 112.

Additionally or alternatively, Test Controller 130 (through Test Deployment System 112 or directly) may load the necessary additional machine configuration data from local storage or remote storage, such as Test Storage 164 of Remote Computer System 162. Alternatively or additionally, user input may be received by Test Deployment System 112 to generate the additional machine configuration data.

At step 220, FPGA 133 performs the configuration based on the configuration data. In an embodiment, FPGA 133 communicates with interface component(s) 135 (e.g., ADC/DACs) and other components to write into their respective configuration settings (e.g., data acquisition/signal generation settings).

At step 230, upon the configuration of Materials Test Machine 140 and Test Controller 130, the data acquisition process is initiated, thereby causing Test Controller 130 to continuously collect sensor data from Materials Test Machine 140, in an embodiment. The acquired data is sent to the CPU 131 to process, log, and/or communicate to Materials Test Platform 110. The acquired sensor data may also be used for generating process variables for control of the materials testing, as discussed at step 245.

To start the materials testing, CPU 131 sends to FPGA 133 a request to initiate the generation of the control signal for Materials Test Machine 140 at step 240. Additionally, FPGA 133 may configure the control loop parameters (e.g., feedback signal based on sensor data that is used for the actuator control) based on the received sensor data at step 230. FPGA 133 may additionally configure control coefficients for the loop parameters.

Otherwise, if no command to start the materials testing is received at step 240, then the process proceeds to end materials testing and transition to the idle state of Materials Test Machine 140 at step 290.

If the command to start the materials test is received at step 240, the process proceeds to step 242. At step 242, FPGA 133 makes a determination whether the control loop for controlling actuator devices, such as Actuator Device 142B, is an open-loop operation or a closed-loop operation. The determination may be performed based on Test Config Data 139 and/or Machine Config Data 137 or based on user input. If the process determines that the operation is open-loop control, the process skips step 245 and proceeds to step 250. FPGA 133 directly controls Materials Test Machine 140 by generating a control signal as described in steps 240 to 260. Such operation by FPGA 133 is referred to herein as "open-loop" control of materials testing by FPGA 133.

On the other hand, the control signal generation based at least in part on collected sensor data is referred to herein as "closed-loop" control of materials testing by FPGA 133. Accordingly, if, at step 242, the process determines that the materials testing is performed in closed-loop control, then the process proceeds to step 245 to generate process variable(s) based at least in part on the collected sensor data at step 230. The process variables are used by FPGA 133 to adjust the actuator device(s) accordingly.

FPGA 133 generates the input signal to Materials Test Machine 140 at step 260, for example, on a point-by-point basis for the desired motion. The desired motion may be determined by test config data 139 (e.g., waveform settings, such as frequency and amplitude). Because FPGA has high-speed processing, FPGA 133 may generate a high-precision waveform, where the time period for neighboring points of the control signal may reach several nanoseconds.

In an embodiment in which FPGA 133 operates in the open-loop operation, each point of the waveform indicates both the desired state and the next state of the materials testing. The digital signal of the point in the waveform is directly provided to DAC (Digital to Analog Converter) or another interface logic (without any control algorithm processing) to generate the corresponding analog signal output of the waveform for Actuator Device 142B to transition to the desired/next state.

Alternatively, in an embodiment in which FPGA 133 operates in the closed-loop operation, each point of the waveform indicates the desired state of the materials testing, while at least a portion of the sensor data received at step 230 (and the process variable(s) generated at step 245 based on the sensor data) represents the current state of the materials testing. To determine the output for Materials Test Machine, each point of the generated waveform and the process variable(s) are further processed by FPGA 133's control algorithm, which yields the necessary adjustment output for Actuator Device 142B for the materials testing to transition to the desired state.

In the closed-loop operation, FPGA 133 may be configured to use a different control algorithm. For example, test config data 139 or machine config data 137 may indicate which control algorithm for FPGA 133 to use. Based on the config data, FPGA may be configured or reconfigured to use a different control algorithm for the closed-loop operation. In an embodiment, FPGA 133 may be reconfigured after an iteration of materials testing or after the completion of the materials testing (e.g., by loading new test config data). Non-limiting examples of control algorithm configured to be performed by FPGA 133 includes a PID (proportional-integral-derivative), fuzzy logic, feed-forward, static-null-pacing, dynamic-null pacing, adaptive amplitude, and mean-control algorithms.

Step 260 may include sending to Actuator Device 142B control signal(s) for Actuator Device 142B to perform the desired motion to transition to the next state.

Figure 3A:
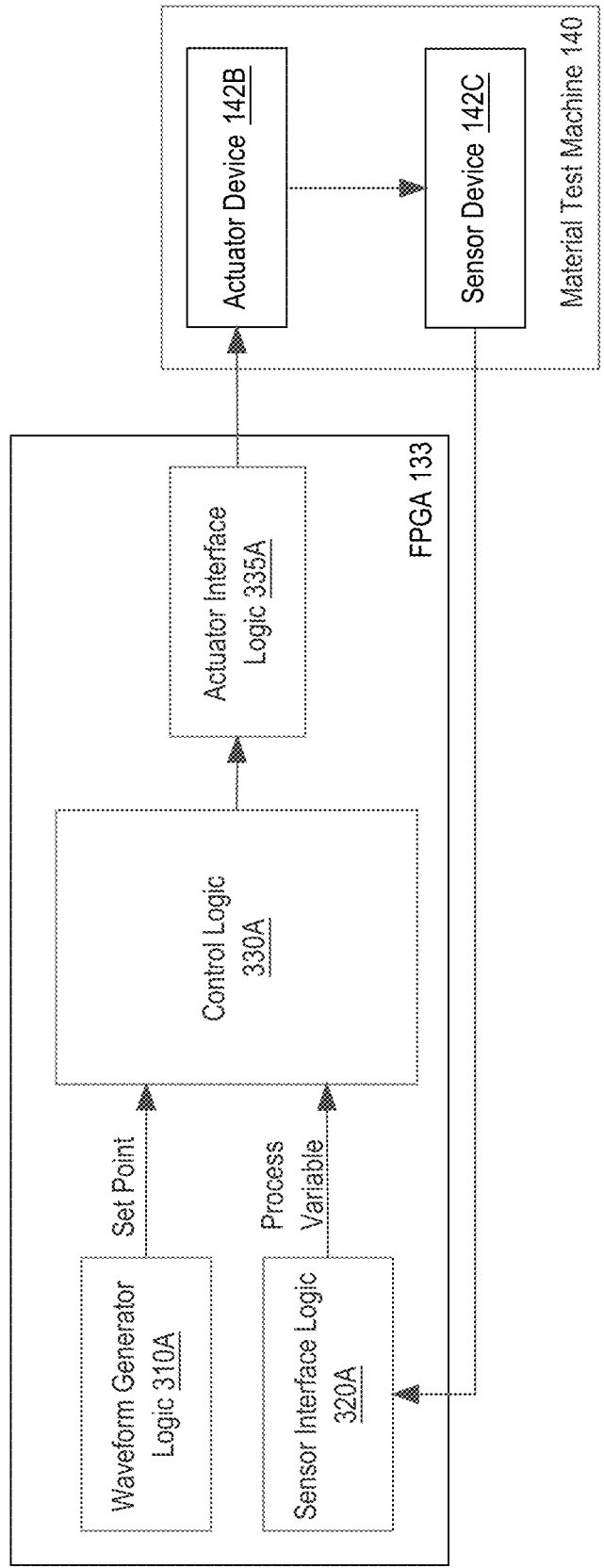
FIG. 3A is a block diagram that depicts data flow using an FPGA-based test controller in a single control loop, in an embodiment.

In an embodiment, point(s) in the generated waveform act as a setpoint in a control closed-loop with sensors feedback. FIG. 3A is a block diagram that depicts data flow using an FPGA-based test controller in a single control loop, in an embodiment. FPGA 133 is programmed to contain Waveform Generator Logic 310A, Sensor Interface Logic 320A, Control Logic 330A, and Actuator Interface Logic 335A.

At the start of the acquisition, Sensor Device 142C of Materials Test Machine 140 collects measurements that are transmitted as sensor data to Sensor Interface Logic 320A. Sensor Device 142C measures one or more physical properties of the sample material(s) on which the materials testing is performed. To receive the sensor data by FPGA 133, Sensor Device 142C may be communicatively coupled with Interface Component(s) 135 (not depicted in FIG. 3A), from which the sensor data is read by Sensor Interface Logic 320A. Sensor Interface Logic 320A converts the received sensor data into a control process variable value that represents a particular state of the materials testing by Materials Test Machine 140. The conversion may include calculations to generate a process variable value used by the control algorithm logic of Control Logic 330A. The process variable value is provided to Control Logic 330A as an input to its implemented control algorithm logic. Non-limiting examples of control algorithms implemented by Control Logic 330A include a PID, fuzzy logic, feed-forward, static-null-pacing, dynamic-null pacing, adaptive amplitude, and mean-control algorithms.

Although only one sensor device, Sensor Device 142C, and its corresponding sensor interface logic, Sensor Interface Logic 320A of FPGA 133, are depicted in FIG. 3A, in other embodiments, multiple sensor devices and/or multiple sensor interface logics may be present in MTS 100. In such an embodiment, multiple process variables are calculated based on the received sensor data and provided to Control Logic of 330A as input together with the setpoint generated by Waveform Generator 310A.

The setpoint for the control algorithm logic of Control Logic 330A is a point in a waveform generated by Waveform Generator Logic 310A, in an embodiment. Waveform Generator Logic 310A generates a waveform of points based on test config data 139. At various iterations of the control loop, a different setpoint of the generated waveform may be presented as an input to Control Logic 330A. The term "iteration of a control loop" (or simply "iteration") refers herein to each calculation of output made by control logic for control actuator(s).

The received setpoint represents the desired state of materials testing, while the one or more input process variables represent the current state of the materials testing. Based on the setpoint and the process variables, Control Logic 330A calculates the necessary output to feed to the actuator interface for the corresponding signal to transmit to Actuator Device 142B. The signal causes an adjustment to a new state from the existing state that is closer to the desired state. The desired state for a particular setpoint may be achieved by multiple iterations of the control loop with different process variables to yield control logic output at Control Logic 330A. Actuator Interface Logic 335A may convert the output of the control algorithm logic of Control Logic 330A to the input signal to Actuator Device 142B to effectuate the desired change.

Thus, at each iteration, the desired change in the materials testing occurs as fast as the frequency at which Control Logic 330A is able to calculate the new output for Actuator Device 142B. In an embodiment, for a particular setpoint in the generated waveform, FPGA 133 may perform multiple iterations of Control Logic 330A calculation. Thereby, FPGA 133 generates multiple output signals at Actuator Interface Logic 340, causing Actuator Device 142B to move as close to the desired state as possible. In such an embodiment, Sensor Interface Logic 310A of FPGA 133 may process sensor data from Sensor Device 142C at a faster rate than the frequency of setpoints generated by Waveform Generator 310A. Such usage of an FPGA that has been programmed with a dedicated hardware control logic and/or input/output signal processing considerably speeds up the calculation of the control algorithm, thereby increasing the precision and accuracy of the materials testing.

Figure 3B:
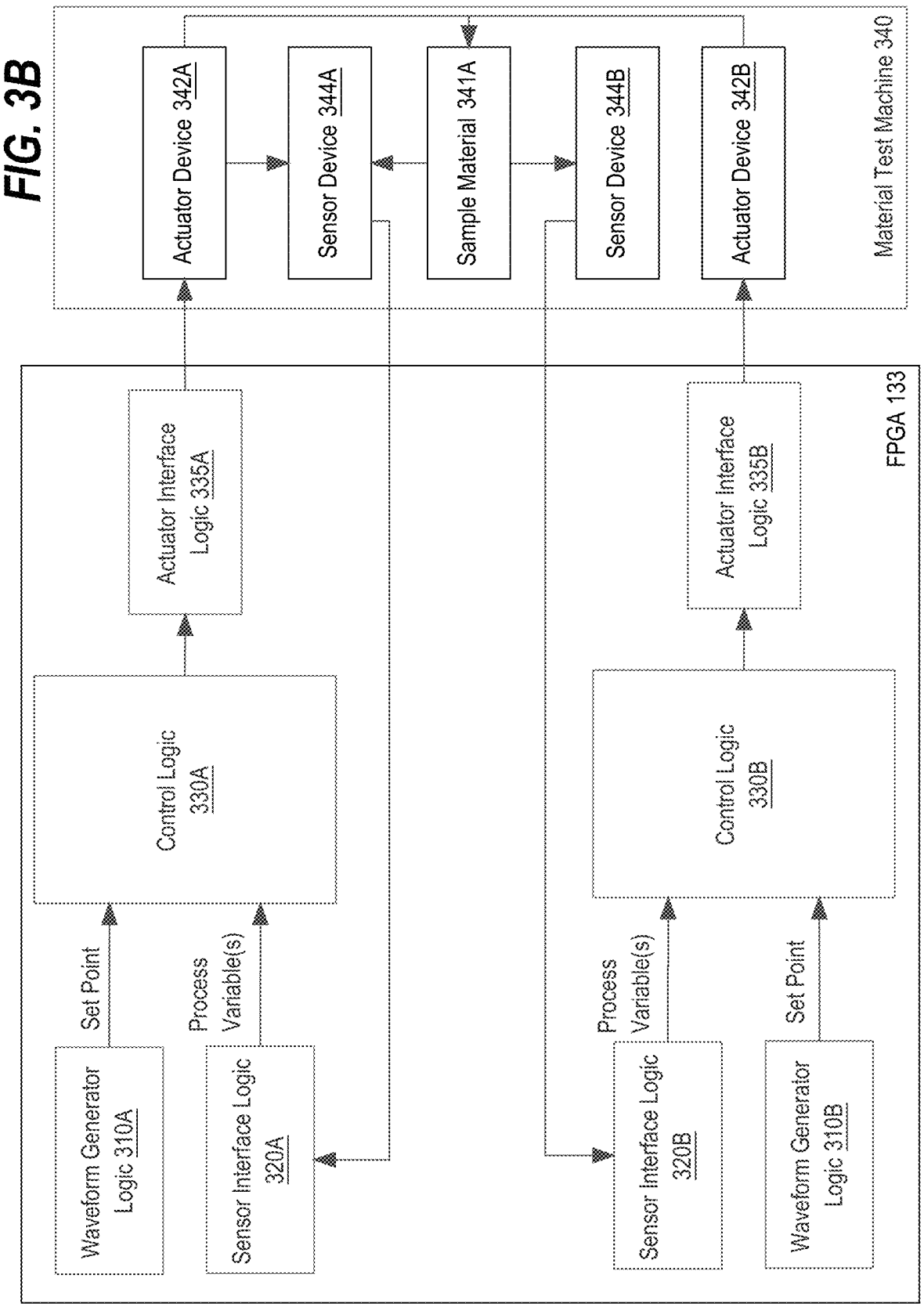
FIG. 3B is a block diagram that depicts parallel data flow for multiple control logics programmed within an FPGA-based test controller, in an embodiment.

FIG. 3B is a block diagram that depicts parallel data flow for multiple control logics programmed within an FPGA-based test controller, in an embodiment. FPGA 133 may control in parallel multiple actuator devices, such as Actuator Device 342A and Actuator Device 342B of Materials Test System 340. Actuator Devices 342A and 342B are performing materials testing on same Sample Material 341A. Sensor Devices 344A and 344B collect measurements on the effects of the materials testing on same Sample Material 341. Such effects may be measured by Sensor Device 344A collecting measurements on the physical property(s) of Sample Material 341A, Sensor Device 344B collecting measurements on the physical property(s) of Sample Material 341B. Corresponding Sensor Interface Logics 320A and 320B process the collected data from Sensor Devices 344A and 344B, respectively, and generate respective process variable(s) for Control Logics 330A and 330B. Control Logic 330A may be programmed with different or the same control algorithms and corresponding digital logic as Control Logic 330B. Control Logic 330A generates an output signal for Actuator Interface Logic 335A based on a set point generated by Waveform Generator 310A, indicating the desired state and the process variable(s) indicating the current state. In parallel, Control Logic 330B generates an output signal for Actuator Interface Logic 335B based on a set point generated by Waveform Generator 310B, indicating the desired state and the process variable(s) indicating the current state. Accordingly, FPGA 133 independently controls two actuators at the same time, Actuator Devices 342A and 342B, to perform the materials testing on same Sample Material 341A.

For example, such multi-actuator test machines may be used for multi-axis materials testing, in which each actuator is affecting different motions for the materials testing on the same sample material. Such a configuration is particularly useful for large-scale materials testing (e.g., wind turbine blade specimen).

For multi-control FPGA-based materials test systems, a single set of sensors may be providing feedback to the control loop for determining the process variable(s). In such an example, Sensor Device 344A and its corresponding Sensor Interface Logic 320A generate multiple process variable(s) as input to both Control Logic 330A and/or Control Logic 330B. Control Logics 330A and 330B independently and in parallel calculate output control signals that may cause respective Actuator Devices 342A and 342B to produce different movements.

Additionally or alternatively, the different motions may be produced as a result of the difference in setpoints for Control Logic 330A and Control Logic 330B at control loop iteration (s). In such an embodiment, the materials testing may require different waveform motions by Actuator Device 342A and Actuator Device 342B on the sample material(s). Accordingly, in such an embodiment, Waveform Generator Logic 310A generates a different setpoint than the setpoint generated by Waveform Generator Logic 310B at one or more iterations of the control loop. And while Control Logic 330A may or may not have the same control algorithm logic as Control Logic 330B and the same process variable(s) generated based on the same sensor data from Sensor Device 344A, the generated input signal for motion by Actuator Devices 342A and 342B are different, in such an embodiment.

Figure 3C:
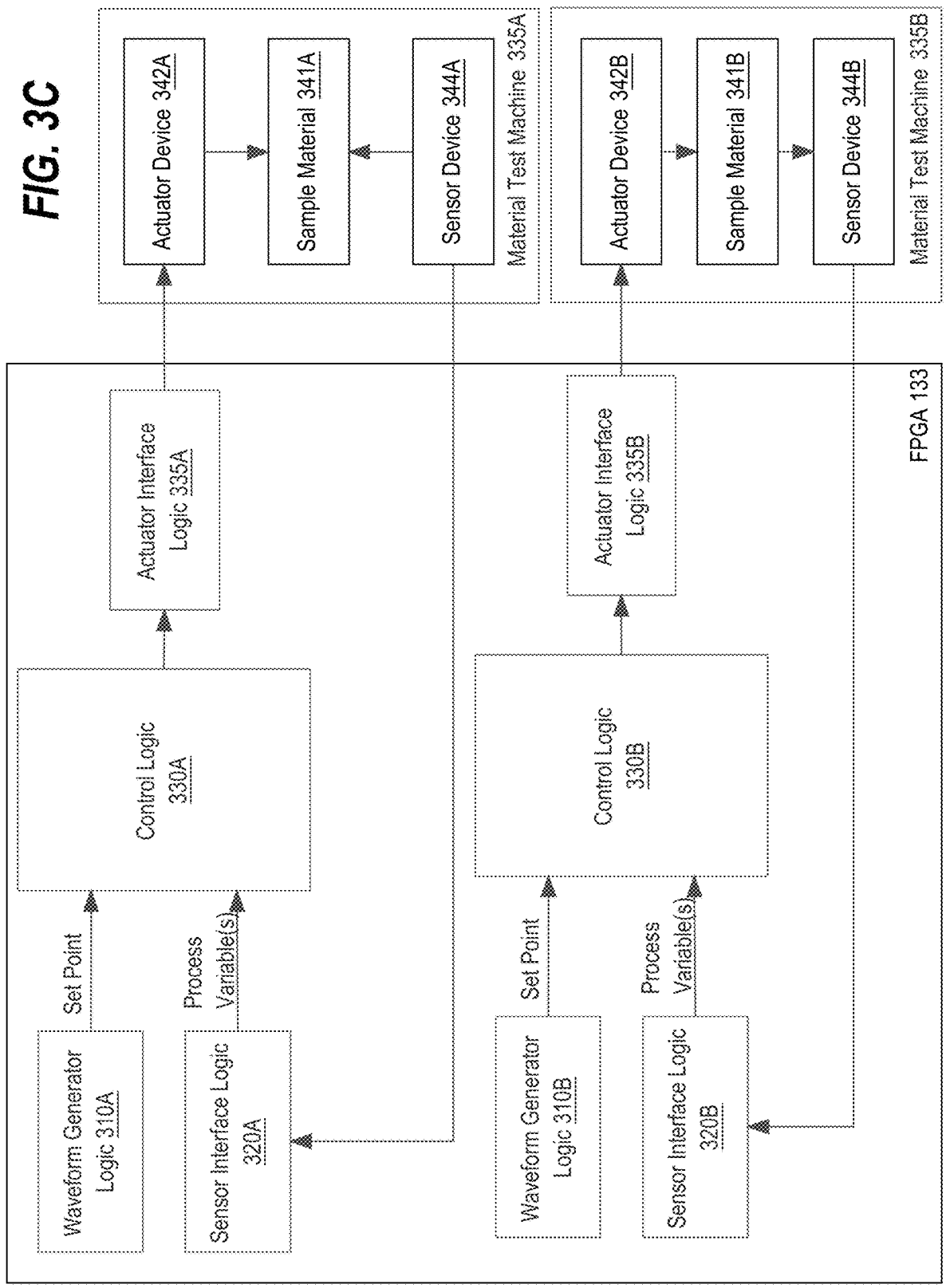
FIG. 3C is a block diagram that depicts a multi-station test management system using an FPGA-based test controller, in an embodiment.

FIG. 3C is a block diagram that depicts a multi-station test management system using an FPGA-based test controller, in an embodiment. FPGA 133 may control multiple materials test machines, Materials Test Machine 335A that performs the materials testing on Sample Material 341A, and Materials Test Machine 335B that performs the materials testing on Sample Material 341B. Materials Test Machine 335A includes Actuator Device 342A and Sensor Device 344A, and Materials Test Machine 335B includes Actuator Device 342B and Sensor Device 344B. As depicted in FIG. 3C, FPGA 133 is programmed to have separate control loops for each of Materials Test Machines 335A and 335B and execute the control logic in parallel.

Accordingly, FPGA 133 independently and in parallel generates actuator input signals based on the control loops and their inputs. Waveform Generator Logic 310A generates setpoint(s) for one or more iterations of Control Logic 330A, while process variables are calculated based on sensor data received by Sensor Interface Logic 320A. Control Logic 330A may be programmed with control algorithm logic different from the control algorithm logic of Control Logic 330B. Accordingly, based on either different sensor data from Sensor Device 344A, different setpoint(s) from Waveform Generator Logic 310A, and/or a different control algorithm logic of Control Logic 330A, Actuator Interface sends input to Actuator Device 342A that produces motion different from Actuator Device 342B.

Similarly, Waveform Generator Logic 310B generates setpoint(s) for one or more iterations of Control Logic 330B, while process variables are calculated based on sensor data received by Sensor Interface Logic 320B. Control Logic 330B may be programmed with control algorithm logic different from the control algorithm logic of Control Logic 330A. Accordingly, based on either different sensor data from Sensor Device 344A or different setpoint(s) from Waveform Generator Logic 310A or a different control algorithm logic of Control Logic 330A, Actuator Interface sends input to Actuator Device 342 that may produce motion different from Actuator Device 342B.

Figure 4:
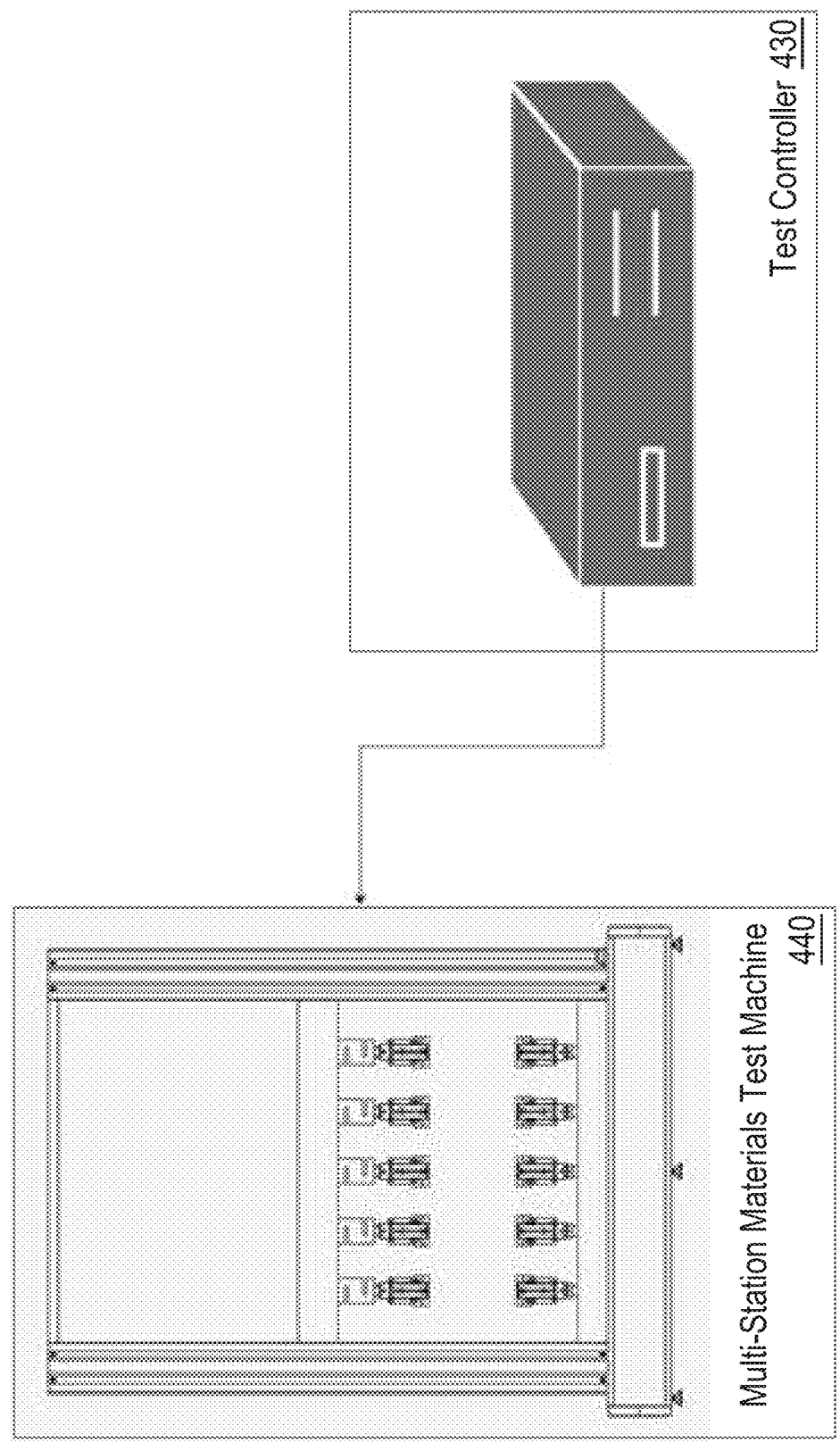
FIG. 4 is a diagram that depicts a multi-station materials test machine, in an embodiment.
Figure 5:
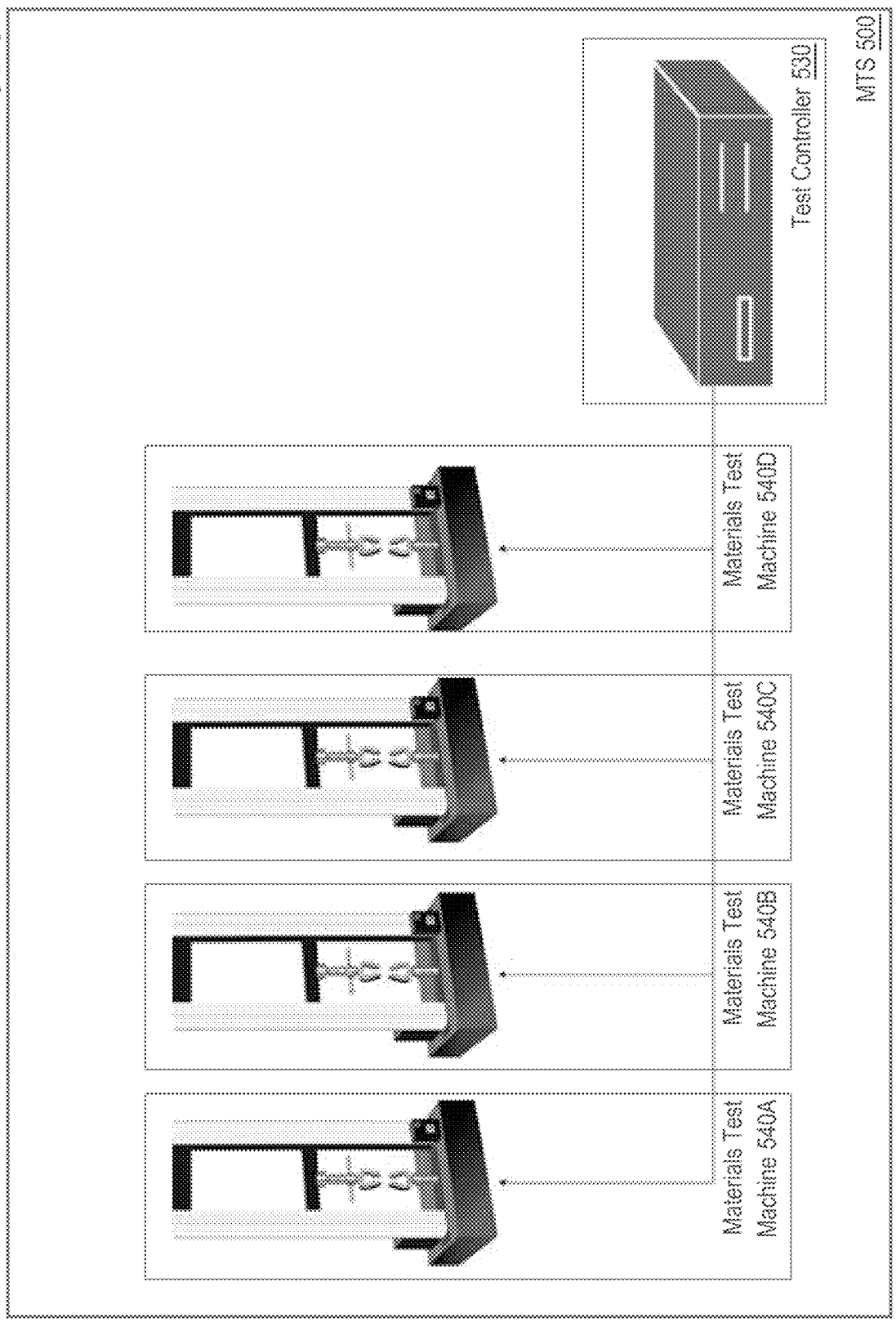
FIG. 5 is a diagram that depicts multi-station MTS 500, in an embodiment.

For example, FIG. 4 is a diagram that depicts a multi-station materials test machine, in an embodiment. Multi-Station Materials Test Machine 440 is implemented as a single frame multi-station machine, which allows simultaneous and parallel materials testing of several specimens by Materials Test Controller 430 that includes an FPGA. As another example, FIG. 5 is a diagram that depicts multi-station MTS 500, which includes fully separate Materials Test Machines 540A-D controlled by same Materials Test Controller 530.

At step 270, the process generates result data. In an embodiment, FPGA 133 continuously collects sensor data from various sensor devices of Materials Test Machine 140. The sensor data may be processed by FPGA 133 to generate the result data. The result data (along with the original sensor data acquired at step 230) may be transmitted and stored at Test Storage 164 of Remote Computer System 162 and/or at Test Analysis System 116. Additionally or alternatively, Test Controller 130 of FPGA 133 may offload the processing of sensor data for analysis to Materials Test Platform 110 on Remote Computer System 162 and/or on Test Analysis System 116. In such an embodiment, Materials Test Platform 110 on Remote Computer System 162 and/or on Test Analysis System 116 perform the processing of the sensor data to generate/store the result data of the materials testing.

The process proceeds back to step 230, in an embodiment. At step 242, the process may receive as input the type of operation to be performed by FPGA 133. Received user input or test configuration data may indicate a change in the type of operation to be performed by FPGA 133. For example, if the materials testing was performed in the closed-loop operation control, the received data may indicate to perform the materials testing by the open-loop control operation by FPGA 133. In such an example, the process transitions to step 250 rather than step 245 and fails to use sensor data for generating the actuator control signal at step 260. FPGA 133 is reconfigured to generate, at step 260, the actuator control signal based on the input of the setpoint without using any acquired sensor data.

In another example, if the materials testing was performed in the open-loop operation control by skipping step 245, the received user input or the test configuration data may indicate for the materials testing to be performed in the closed-loop operation control by FPGA 133. In such an example, the process transitions from step 242 to step 245 rather than to step 240. The process uses the acquired sensor data for generating an actuator control signal at step 260. FPGA 133 is reconfigured to execute a control algorithm based on the input of the setpoint and the process variables generated based on the acquired sensor data at step 245.

Steps 230-270 are executed until a stop condition is not detected by Test Controller 130 at step 240. The stop condition may be detected based on input from Safety Device 142D of Materials Test Machine 140. Test Controller 130 receives an abort signal from Safety Device 142D of Materials Test Machine 140 and stops the materials testing at step 240. The process proceeds to the materials testing idle state at step 290. The Safety Device may be directly communicatively coupled with FPGA 133 to speed up the reaction time to a safety-based stop condition. Alternatively, Test Controller 130 may initiate a stop condition due to the successful completion of the materials testing or in response to a request received by Materials Test Machine 140.

One or more of the steps of FIG. 2 described above may be omitted, repeated, and/or performed in a different order. Accordingly, the specific arrangement of steps shown in FIG. 2 should not be construed as limiting the scope of the invention.

Software Computer System Overview

Figure 6:
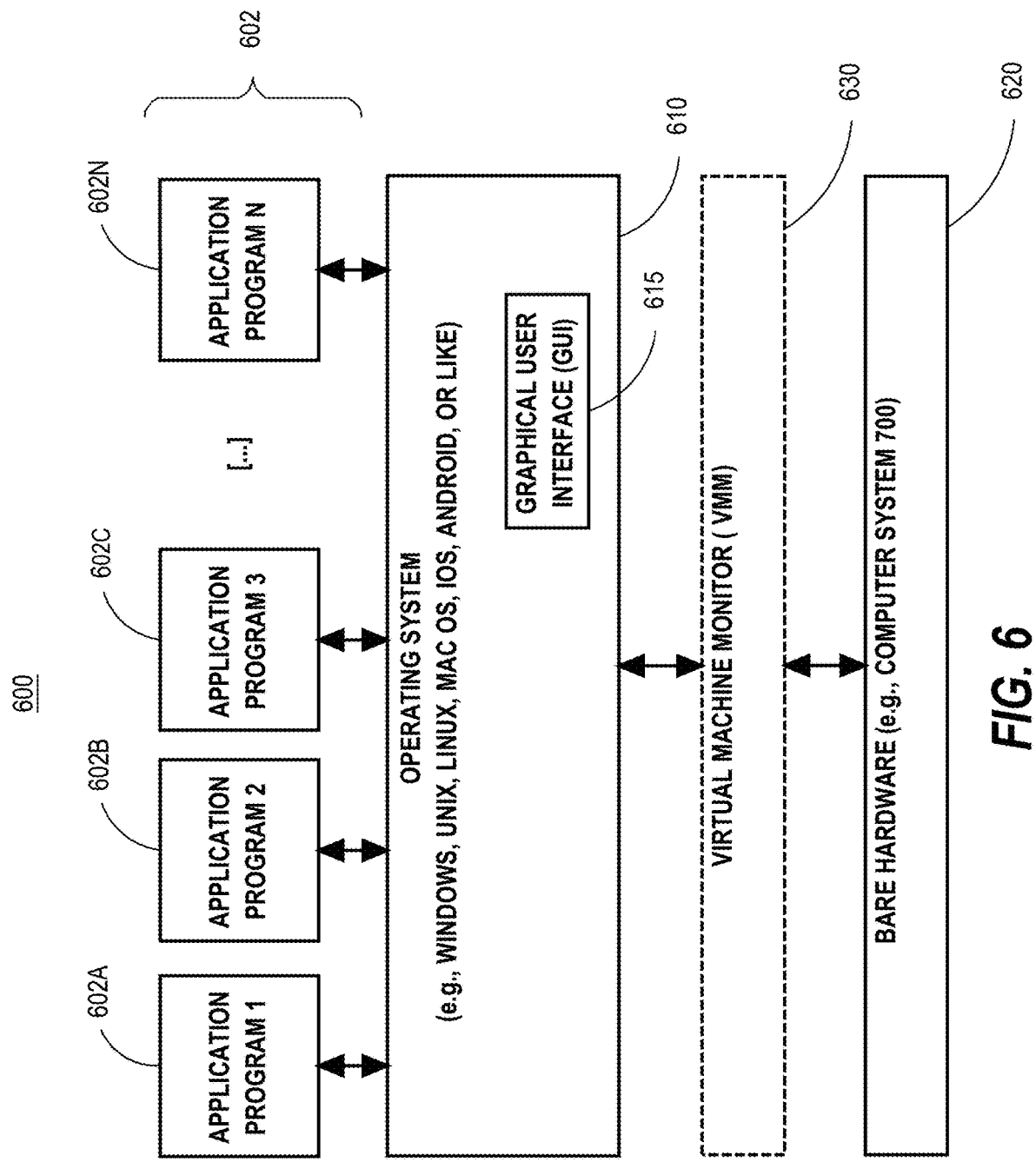
FIG. 6 is a block diagram of a basic software system, in one or more embodiments.
Figure 7:
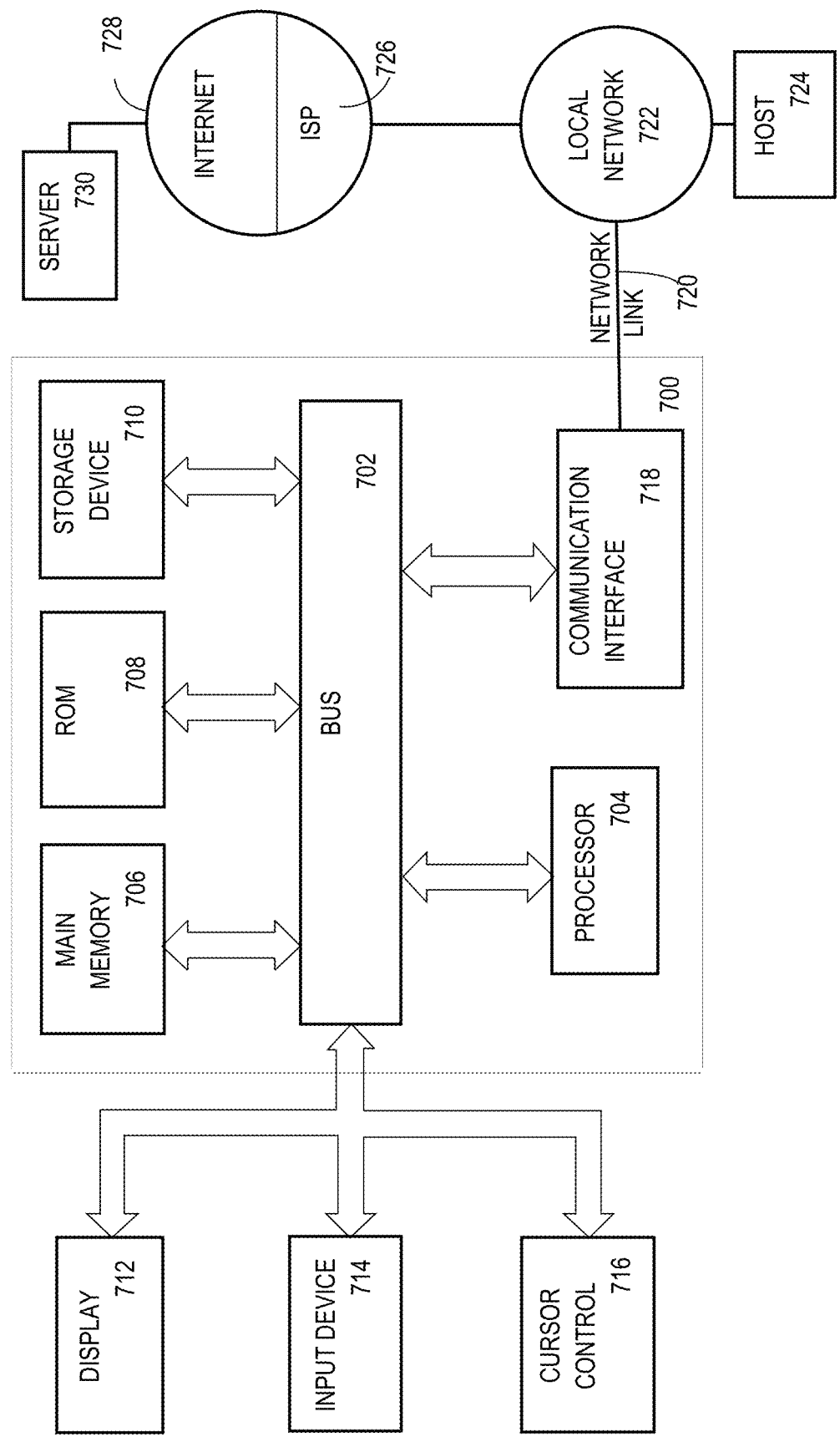
FIG. 7 is a block diagram that illustrates a computer system upon which an embodiment of the invention may be implemented.

FIG. 6 is a block diagram of a basic software system 600 that may be employed for controlling the operation of computing system 700 of FIG. 7. Software system 600 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 700. Software system 600, which may be stored in system memory (RAM) 706 and on fixed storage (e.g., hard disk or flash memory) 710, includes a kernel or operating system (OS) 610.

The OS 610 manages low-level aspects of computer operation, including managing execution of processes, memory allocation, file input and output (I/O), and device I/O. One or more application programs represented as 602A, 602B, 602C . . . 602N, may be "loaded" (e.g., transferred from fixed storage 710 into memory 706) for execution by the system 600. The applications or other software intended for use on computer system 700 may also be stored as a set of downloadable computer-executable instructions, for example, for downloading and installation from an Internet location (e.g., a Web server, an app store, or another online service).

Software system 600 includes a graphical user interface (GUI) 615 for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 704) of computer system 700. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 700.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 700 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., the content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the runtime execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). MTS as a Service (MTSaaS) in which consumers use MTS that is running upon a cloud infrastructure, while a MTSaaS provider manages or controls the underlying cloud infrastructure, applications, and servers, including one or more materials test platforms that may perform analytics of the materials test result among other functions. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment are presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Computer System Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field-programmable gate arrays (FPGAs) that are persistently programmed to perform the techniques or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information and a hardware processor 704 coupled with bus 702 for processing information. Hardware processor 704 may be, for example, a general-purpose microprocessor.

Computer system 700 also includes a main memory 706, such as a random access memory (RAM) or another dynamic storage device, coupled to bus 702 for storing information and instructions to be executed by processor 704. Main memory 706 also may be used for storing temporary variables or other intermediate information during the execution of instructions to be executed by processor 704. Such instructions, when stored in non-transitory storage media accessible to processor 704, render computer system 700 into a special-purpose machine that is customized to perform the operations specified in the instructions.

Computer system 700 further includes read-only memory (ROM) 708 or other static storage devices coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware, and/or program logic, which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal, and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726, in turn, provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722, and communication interface 718.

The received code may be executed by processor 704 as it is received and/or stored in storage device 710 or other non-volatile storage for later execution.

What is claimed is:

1. A materials test controller comprising:
    a Field-Programmable Gate Array (FPGA), the FPGA configured for: acquiring first sensor data from one or more first sensor devices, the first sensor data comprising
        measurements of a first current state of materials testing on one or more first sample materials;
        generating a waveform of a plurality of setpoints, each setpoint of the plurality of setpoints representing a desired state of the materials testing on the one or more first sample materials;
        based on the first sensor data, calculating one or more first process variables for input to a first control logic of the FPGA;
        for a first iteration in a plurality of iterations to generate output signals:
            receiving, at the first control logic, the one or more first process variables and a first setpoint of the plurality of setpoints, and
            based at least in part on the one or more first process variables and the first setpoint of the plurality of setpoints, generating first output signal, by the first control logic, the first output signal causing a first actuator device to transition from the first current state to a new state that is closer to the desired state as measured by the one or more first sensor devices.

2. The materials test controller of claim 1, wherein the first control logic is configured with one of following algorithms that include a proportional-integral-derivative control loop algorithm, fuzzy logic, feed-forward algorithm, static-null-pacing algorithm, dynamic-null pacing algorithm, adaptive amplitude algorithm, and mean-control algorithm.

3. The materials test controller of claim 1, where the FPGA is further configured:
    acquiring second sensor data from the one or more first sensor devices, the second sensor data comprising measurements of a second state of the materials testing on the one or more first sample materials;
    based on the second sensor data, calculating one or more second process variables for input to the first control logic of the FPGA;
    for a next iteration after the first iteration of the plurality of iterations to generate output signals:
        receiving, at the first control logic, the one or more second process variables and the first setpoint of the plurality of setpoints, and
        based at least in part on the one or more second process variables and the first setpoint of the plurality of setpoints, generating second output signal, by the first control logic, the second output signal causing the first actuator device to transition from the new state to a third state that is closer than the new state to the desired state as measured by the one or more first sensor devices.

4. The materials test controller of claim 1, wherein the first sensor data comprises measurements of a second current state of materials testing on one or more second sample materials, the waveform of the plurality of setpoints is a first waveform of a first plurality of setpoints, the desired state is a first desired state and the new state is a first new state, and the FPGA is further configured for: in parallel with generating the first waveform of the first plurality of setpoints:
    generating a second waveform of a second plurality of setpoints, each setpoint of the second plurality of setpoints representing a second desired state of the materials testing on the one or more second sample materials, and
    acquiring second sensor data from the one or more first sensor devices, the second sensor data comprising measurements of a first state of the materials testing on the one or more first sample materials;
    based on the second sensor data, calculating one or more second process variables for input to a second control logic of the FPGA;
    for the first iteration in the plurality of iterations to generate output signals: receiving, at the second control logic, the one or more second process variables and a second setpoint of the second plurality of setpoints, and
    in parallel with the first control logic generating the first output signal and based at least in part on the one or more second process variables and the second setpoint of the second plurality of setpoints, generating second output signal, by the second control logic, the second output signal causing a second actuator device to transition from the second current state to a second new state that is closer to the second desired state as measured by one or more second sensor devices.

5. The materials test controller of claim 1, wherein the waveform of the plurality of setpoints is a first waveform of a first plurality of setpoints, the desired state is a first desired state and the new state is a first new state, and the FPGA is further configured for: in parallel with acquiring the first sensor data, acquiring second sensor data from one or more second sensor devices, the second sensor data comprising measurements of a second current state of materials testing on one or more second sample materials;
    in parallel with generating the first waveform of the first plurality of setpoints, generating a second waveform of a second plurality of setpoints, each setpoint of the second plurality of setpoints representing a second desired state of the materials testing on the one or more second sample materials; based on the second sensor data, calculating one or more second process variables for input to a second control logic of the FPGA; for the first iteration in the plurality of iterations to generate output signals:
    receiving, at the second control logic, the one or more second process variables and a second setpoint of the second plurality of setpoints, and
    in parallel with the first control logic generating the first output signal and based at least in part on the one or more second process variables and the second setpoint of the second plurality of setpoints, generating second output signal, by the second control logic, the second output signal causing a second actuator device to transition from the second current state to a second new state that is closer to the second desired state as measured by the one or more second sensor devices.

6. The materials test controller of claim 5, wherein the first output signal causes the first actuator device to perform a first motion, the second output signal causes the second actuator device to perform a second motion, different from the first motion.

7. The materials test controller of claim 1, wherein the FPGA is further configured for performing the plurality of iterations to generate output signals causing the first actuator device to perform motions corresponding to the waveform of the plurality of setpoints.

8. The materials test controller of claim 1, wherein the FPGA comprises an actuator interface logic and the FPGA further configured for converting the first output signal into a first input signal for the first actuator device.

9. The materials test controller of claim 1, wherein the waveform of the plurality of setpoints is generated based on a test configuration data for the materials testing.

10. The materials test controller of claim 1, wherein the FPGA is configured based at least in part on machine configuration data.

11. A method for materials testing comprising: acquiring first sensor data from one or more first sensor devices, the first sensor data comprising measurements of a first current state of the materials testing on one or more first sample materials;
   generating a waveform of plurality of setpoints, each setpoint of the plurality of setpoints representing a desired state of the materials testing on the one or more first sample materials;
   based on the first sensor data, calculating one or more first process variables for input to a first control logic;
   for a first iteration in plurality of iterations to generate output signals: receiving, at the first control logic, the one or more first process variables and a first setpoint of the plurality of setpoints, and based at least in part on the one or more first process variables and the first setpoint of the plurality of setpoints, generating first output signal, by the first control logic, the first output signal causing a first actuator device to transition from the first current state to a new state that is closer to the desired state as measured by the one or more first sensor devices; wherein the method is performed by a Field-Programmable Gate Array (FPGA).

12. The method of claim 11, wherein the first control logic is configured with one of following algorithms that include a proportional-integral-derivative control loop algorithm, fuzzy logic, feed-forward algorithm, static-null-pacing algorithm, dynamic-null pacing algorithm, adaptive amplitude algorithm, and mean-control algorithm.

13. The method of claim 11, further comprising:
   acquiring second sensor data from the one or more first sensor devices, the second sensor data comprising measurements of a second state of the materials testing on the one or more first sample materials;
   based on the second sensor data, calculating one or more second process variables for input to the first control logic of the FPGA;
   for a next iteration after the first iteration of the plurality of iterations to generate output signals:
      receiving, at the first control logic, the one or more second process variables and the first setpoint of the plurality of setpoints, and
      based at least in part on the one or more second process variables and the first setpoint of the plurality of setpoints, generating second output signal, by the first control logic, the second output signal causing the first actuator device to transition from the new state to a third state that is closer than the new state to the desired state as measured by the one or more first sensor devices.

14. The method of claim 11, wherein the first sensor data comprises measurements of a second current state of the materials testing on one or more second sample materials, the waveform of the plurality of setpoints is a first waveform of a first plurality of setpoints, the desired state is a first desired state and the new state is a first new state, and the method further comprising: in parallel with generating the first waveform of the first plurality of setpoints:
   generating a second waveform of a second plurality of setpoints, each setpoint of the second plurality of setpoints representing a second desired state of the materials testing on the one or more second sample materials, and
   acquiring second sensor data from the one or more first sensor devices, the second sensor data comprising measurements of a first state of the materials testing on the one or more first sample materials;
   based on the second sensor data, calculating one or more second process variables for input to a second control logic of the FPGA; for the first iteration in the plurality of iterations to generate output signals:
   receiving, at the second control logic, the one or more second process variables and a second setpoint of the second plurality of setpoints, and
   in parallel with the first control logic generating the first output signal and based at least in part on the one or more second process variables and the second setpoint of the second plurality of setpoints, generating second output signal, by the second control logic, the second output signal causing a second actuator device to transition from the second current state to a second new state that is closer to the second desired state as measured by one or more second sensor devices.

15. The method of claim 11, wherein the waveform of the plurality of setpoints is a first waveform of a first plurality of setpoints, the desired state is a first desired state and the new state is a first new state, and the method further comprising:
   in parallel with acquiring the first sensor data, acquiring second sensor data from one or more second sensor devices, the second sensor data comprising measurements of a second current state of the materials testing on one or more second sample materials;
   in parallel with generating the first waveform of the first plurality of setpoints, generating a second waveform of a second plurality of setpoints, each setpoint of the second plurality of setpoints representing a second desired state of the materials testing on the one or more second sample materials;
   based on the second sensor data, calculating one or more second process variables for input to a second control logic of the FPGA;
   for the first iteration in the plurality of iterations to generate output signals: receiving, at the second control logic, the one or more second process variables and a second setpoint of the second plurality of setpoints, and
   in parallel with the first control logic generating the first output signal and based at least in part on the one or more second process variables and the second setpoint of the second plurality of setpoints, generating second output signal, by the second control logic, the second output signal causing a second actuator device to transition from the second current state to a second new state that is closer to the second desired state as measured by the one or more second sensor devices.

16. The method of claim 15, wherein the first output signal causes the first actuator device to perform a first motion, the second output signal causes the second actuator device to perform a second motion, different from the first motion.

17. The method of claim 11 further comprising performing the plurality of iterations to generate output signals causing the first actuator device to perform motions corresponding to the waveform of the plurality of setpoints.

18. The method of claim 11, wherein the FPGA comprises an actuator interface logic and the method further comprising converting the first output signal into a first input signal for the first actuator device.

19. The method of claim 11, wherein the waveform of the plurality of setpoints is generated based on a test configuration data for the materials testing.

20. The method of claim 11, wherein the FPGA is configured based at least in part on machine configuration data.

* * * * *